April 7, 1931.　　　C. W. WEISS　　　1,799,662
SHOCK ABSORBER
Filed June 18, 1930
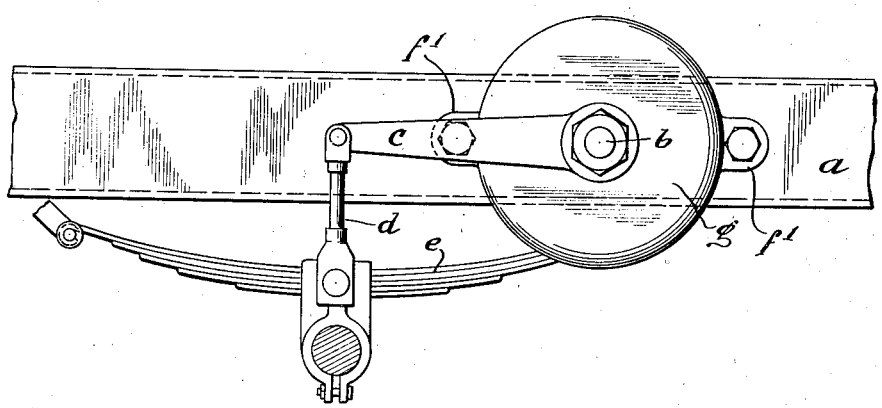
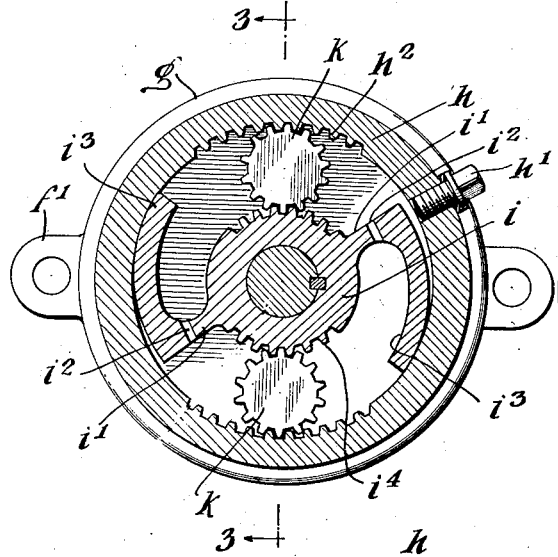
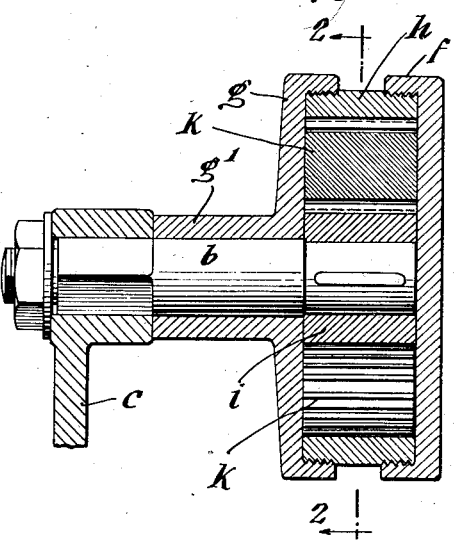
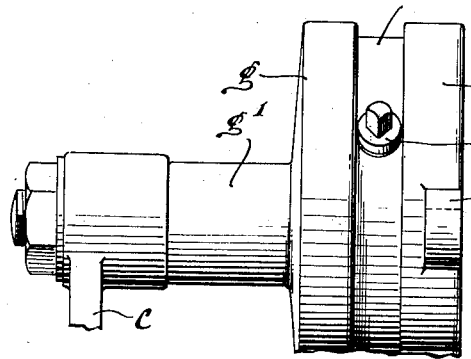
Inventor
Carl W. Weiss
By his Attorneys
Redding, Greeley, O'Shea Campbell Patented Apr. 7, 1931

1,799,662

UNITED STATES PATENT OFFICE

CARL W. WEISS, OF BROOKLYN, NEW YORK

SHOCK ABSORBER

Application filed June 18, 1930. Serial No. 461,859.

The purpose in view in this invention has been to meet requirements which have developed in the widely extending use of shock absorbers in various branches of industry, including not only automobiles but machines of kinds in which it is desirable to prevent the transmission of shocks from one part to another. The invention has been developed and for convenience will be described with reference to its application to automobiles, but it will be understood that it is not limited to its application to automobiles. One practical requirement which it has been sought to meet is that the construction shall be such as to provide for free relative movement and, in the case of automobiles, for free spring action for the body of the car in response to relatively small shocks such as those experienced when an automobile is moving over a relatively smooth road, while the greater shocks, such as those experienced, for example, when an automobile moves over a rough road, shall be checked instantly with sufficient resistance to prevent the transmission of such shocks. Another requirement is that the construction of the shock absorber shall permit compression of the springs with less resistance than that offered expansion of the springs, thereby securing less reaction on the body of the car, less vibration and more comfortable riding. Still another requirement is that the construction shall be such as to prevent, in shock absorbers which depend for their action on the displacement of a fluid, the leakage of fluid past the displacer without requiring extreme accuracy of fit, while at the same time the moving parts shall be at all times properly lubricated. All of these requirements are met and other advantages, which will appear, are secured by the construction to be described.

The invention will be more fully explained hereinafter with reference to the accompanying drawing in which it is illustrated, and in which:—

Figure 1 is a view in side elevation illustrating the application of a shock absorber, such as that to be described, to an automobile.

Figure 2 is a view of the improved shock absorber in section on the plane indicated by the broken line 2—2 of Figure 3.

Figure 3 is a view of the same in axial section on the plane indicated by the broken line 3—3 of Figure 2.

Figure 4 is a partial view in elevation of the shock absorber shown in Figures 2 and 3.

The invention is particularly concerned with shock absorbers of that type in which the resistant fluid is enclosed within a circular chamber and in which the displacer is rotatably mounted within such chamber, the shock absorber being usually mounted on some part $a$ of the body of the automobile, as shown in Figure 1, and having on its shaft $b$, an arm $c$ which is connected by linkage $d$ with a spring $e$ on the same side of the car.

In the construction chosen for illustration of the invention the circular chamber is formed by two flanged plates $f$ and $g$ and an intermediate sleeve-like member $h$. The member $f$ is shown in Figure 1 as having lugs $f^1$ by which the shock absorber is secured to the part $a$. The plate or member $g$ is shown as having a sleeve extension $g^1$ to receive the shaft $b$ of the displacer. The intermediate member or cylinder $h$ has a threaded engagement with the flanged members $f$ and $g$ and may be provided with a filling opening $h^1$ for convenience in the introduction of the resistant fluid. The cylinder member $h$ is toothed interiorly for a portion of its circumference for a purpose to be explained.

The displacer, which obviously might be a single action displacer, is shown as a double action displacer comprising a hub $i$, which may be keyed on the shaft $b$, webs $i^1$, having each a restricted aperture $i^2$, and a bearing portion $i^3$ which is connected with the web $i^1$ at one end only and is extended therefrom in one direction so as to have a limited degree of elasticity. Each member $i^3$ conforms substantially to the curvature of the cylinder member $h$ with which it is in contact, but is tapered off slightly from the free end so as to admit a wedge-shaped film of liquid between the two surfaces. The displacer is also toothed, as at $i^4$, for engagement with a toothed idler $k$ which meshes on one side with the toothed hub of the displacer and on the other side with the toothed portion $h^2$ of the cylinder member $h$. It will be understood that the displacer extends from side to side of the chamber and is in close working contact with the inner faces of the plates $f$ and $g$.

There is necessarily some looseness of fit between the teeth of the idler and the teeth of the coacting toothed portions of the displacer and the cylinder and also the idler moves bodily in the direction of rotation of the displacer. It will be seen, therefore, that when the shocks are slight, as when the car is moving over a relatively smooth road, the displacer moves within the cylinder with but little resistance, free spring action being permitted. It will also be understood that when a severe shock is experienced, as when the wheel of the vehicle drops into a rut in the road surface, the movement imparted to the displacer is greater and the effort exerted by the displacer upon the fluid which fills the space between the idlers on each side is greater and the resistance offered by the fluid in its passage through the openings $i^2$ is also greater. When the movement of the displacer is slight the toothed idler $k$, which rolls on the coacting toothed portions of the displacer and the cylinder, moves freely and offers but little resistance to the passage of the fluid from one side of the idler to the other. When, however, the pressure is great the teeth of the idler are pressed against the teeth of the coacting portions $h^2$ and $i^4$ and prevent the passage of the fluid from one side of the idler to the other. The greater the pressure the more effective is the idler as a preventer of the passage of the fluid. The greater the pressure on the fluid, the greater also is the pressure with which the free end of each member $i^3$ of the displacer is pressed against the untoothed wall of the cylinder and leakage of fluid between such member and the wall of the cylinder is thereby prevented without requiring such closeness of fit as would otherwise be required. It will be seen that the resistance offered to the movement of the displacer does not permit the wheel to drop freely to follow the contour of the depression over which it passes, the reaction on the chassis of the car being therefore less severe. When, on the other hand, the wheel passes over an obstruction on the road surface and its axis receives an upward movement, the resistance to the displacer movement and so to the axle of the car is less because when the fluid enters the tapered space between the displacer and the cylinder a relatively greater quantity of liquid is permitted to pass from one side of the displacer to the other than is permitted to pass in the reverse direction in the downward movement of the axle.

It will be understood that changes in details of construction and arrangement can be made to suit different conditions of use and that the invention, except as pointed out in the accompanying claims, is not restricted to the particular construction shown and described herein.

I claim as my invention:—

1. In a shock absorber, a circular chamber, a rotatable displacer mounted centrally within the cylinder and adapted for contact therewith, the inner wall of the cylinder and a hub of the displacer being toothed, and a toothed idler in engagement with the toothed portions of the cylinder and the displacer.

2. In a shock absorber, a circular chamber, a rotatable displacer mounted centrally within the cylinder and adapted for contact therewith, the inner wall of the cylinder and the hub of the displacer being toothed, and a toothed idler in engagement with the toothed portions of the cylinder and the displacer, the displacer having a web with a restricted opening.

3. In a shock absorber, a circular chamber, a rotatable displacer mounted centrally within the cylinder and adapted for contact therewith, the inner wall of the cylinder and the hub of the displacer being toothed, and a toothed idler in engagement with the toothed portions of the cylinder and the displacer, the displacer having a web and a member extended from the web in one direction to have a slight degree of elasticity.

4. In a shock absorber, a circular chamber, a rotatable displacer mounted centrally within the cylinder and adapted for contact therewith, the inner wall of the cylinder and the hub of the displacer being toothed, and a toothed idler in engagement with the toothed portions of the cylinder and the displacer, the displacer having a web and a member extended from the web in one direction to have a slight degree of elasticity, the contacting surface of said member being shaped to form at one end a tapered space between itself and the cylinder wall.

This specification signed this 9th day of June A. D. 1930.

CARL W. WEISS.